United States Patent [19]
Takeuchi

[11] Patent Number: 5,946,126
[45] Date of Patent: Aug. 31, 1999

[54] LASER SCANNING OPTICAL SYSTEM

[75] Inventor: Shuichi Takeuchi, Saitama-ken, Japan

[73] Assignee: Asahi Kogaku Kogyo Kabushiki Kaisha, Tokyo, Japan

[21] Appl. No.: 09/110,321

[22] Filed: Jul. 6, 1998

[30] Foreign Application Priority Data

Jul. 8, 1997 [JP] Japan .................................. 9-197844

[51] Int. Cl.⁶ .............................................. G02B 26/08
[52] U.S. Cl. ........................ 359/216; 359/206; 359/217
[58] Field of Search .................................. 359/216–219, 359/205, 206, 662

[56] References Cited

U.S. PATENT DOCUMENTS 4,756,584 7/1988 Takanashi ........................... 359/218
4,993,792 2/1991 Minoura .

FOREIGN PATENT DOCUMENTS 58-68014 4/1983 Japan .

*Primary Examiner*—James Phan
*Attorney, Agent, or Firm*—Greenblum & Bernstein, P.L.C.

[57] ABSTRACT

Disclosed is a laser scanning optical system wherein light emitted from a laser source is deflected by a polygonal mirror to a scanning target surface via an imaging optical system. The laser source, the polygonal mirror, and the imaging optical system are arranged such that a stationary ghost image formed by an m-th reflection surface is formed out of the light source side end of an effective scanning range on the target surface, and a stationary ghost image formed by an (m+1)-th reflection surface is formed out of the other end of the effective scanning range.

6 Claims, 1 Drawing Sheet

LASER SCANNING OPTICAL SYSTEM

BACKGROUND OF THE INVENTION

The present invention relates to a laser scanning optical system to be employed in an image depicting device such as a laser plotter, and more particularly to a laser scanning optical system capable of restraining appearance of a stationary ghost image on a scanned surface.

In a laser scanning optical system of an image depicting device, generally, a light beam (a laser beam) emitted from a laser source is deflected by a deflector such as a polygonal mirror, and led to a target surface (i.e., a surface to be scanned) via an imaging optical system such as an fθ lens for scanning the target surface.

In this specification, a light beam which is directly incident from a laser source on one reflection surface of the polygonal mirror and reflected thereby to reach a target surface is called as a "normal" light beam.

A part of the normal light beam is diffuse-reflected on a target surface and returned to the polygonal mirror through the imaging optical system. If thus returned light is reflected by other reflection surface(s) of the polygonal mirror and led to the target surface again through the imaging optical system, a ghost image is formed on the target surface at a position different from that of an image formed by the normal light beam. In this specification, light which forms a ghost image is called as a "ghost" light.

A position where the ghost image is formed is fixed on the target surface despite positional change of a spot of the normal light beam on the target surface for scanning, since influence due to movement of a spot on a target surface is cancelled out with influence due to rotation of a polygonal mirror. In this specification, such a ghost image, whose position on the target surface is fixed, is called as a "stationary ghost."

Japanese Patent Provisional Publication No. SHO 58-68014 discloses an arrangement of optical elements for canceling a stationary ghost formed by a reflection surface next to the reflection surface on which the normal light beam is incident. In the JP publication, an angle α formed between a principal ray of a light beam incident on a polygonal mirror and an optical axis of an imaging optical system (i.e., an fθ lens) on a main scanning plane satisfies the following condition:

$$\alpha < (4/N) - (W/D)$$

where, N represents the number of reflection surfaces of a polygonal mirror;

W represents a distance, on a target surface, from the optical axis of the imaging optical system to the end of an effective scanning range; and D represents a distance between a target surface and a target surface side principal point of the imaging optical system.

In the scanning optical system disclosed in the JP publication described above, if the number of the reflection surfaces of the polygonal mirror is relatively small—eight (8) surfaces in the embodiment—the angle α can be set to a relatively large value, and therefore it allows relatively large freedom in designing the scanning optical system.

However, if the number of the reflection surfaces of the polygonal mirror is increased for high speed depicting, for example, to sixteen (16) or more, in order to satisfy the above equation, the value of the angle α becomes small, resulting in limiting the design freedom. For example, when the number N of the reflection surfaces is twenty-four (24), the distance D is 100 [mm], and the distance W is 20 [mm], the angle α becomes less than 18.5°, which is not a practical figure. It causes such a problem that the normal light beam to be incident upon the polygonal mirror interferes with the imaging optical system.

SUMMARY OF THE INVENTION

It is therefore an object of the present invention to provide an improved laser scanning optical system in which a stationary ghost will not be formed within an effective scanning range on a surface to be scanned even if the number of the reflection surfaces of the polygonal mirror is relatively large, and further a light beam incident upon a polygonal mirror does not interfere with an imaging optical system.

For the above object, according to the present invention, there is provided a laser scanning optical system, wherein a light beam incident on a reflection surface of a polygonal mirror is deflected thereby to a surface to be scanned via an imaging optical system, the scanning optical system being arranged to satisfy the following conditions (1) and (2):

$$\alpha < \frac{4\pi}{N} \cdot m - \frac{W1}{f} \quad (1)$$

$$\alpha > \frac{4\pi}{N} \cdot (m+1) - \frac{W2}{f} \quad (2)$$

where, α represents an angle (unit:rad) at which a principal ray of a light beam incident on the polygonal mirror from the laser source and the optical axis of the imaging optical system crosses;

N represents the number of reflection surfaces of the polygonal mirror;

f represents a focal length (unit:mm) of the imaging optical system in a principal scanning direction;

W1 represents a position (unit: mm) on said scanning target surface with respect to the optical axis of said imaging optical system to the laser-source-side end of an effective scanning range, W1 having a negative value;

W2 represents a position (unit:mm) on said scanning target surface with respect to the optical axis of said imaging optical system to the other end of said effective scanning range, W2 having a positive value; and m is a natural number arbitrarily chosen based upon the number N of the reflection surfaces of the polygonal mirror.

In the embodiments, a principal ray of light beam incident on a reflection surface of the polygonal mirror and a principal ray of light beam deflected by the polygonal mirror are both included on a main scanning plane. Further, the polygonal mirror and the target surface are substantially conjugate with respect to the imaging optical system in an auxiliary scanning plane which is perpendicular to the principal scanning plane.

Optionally, the imaging optical system comprises an fθ lens.

Preferably, the polygonal mirror has 16 or more reflection surfaces. Further, it is desirable to design a laser scanning optical system such that the angel α is set to be less than 90.

DESCRIPTION OF THE PREFERRED EMBODIMENT

Figure 1:
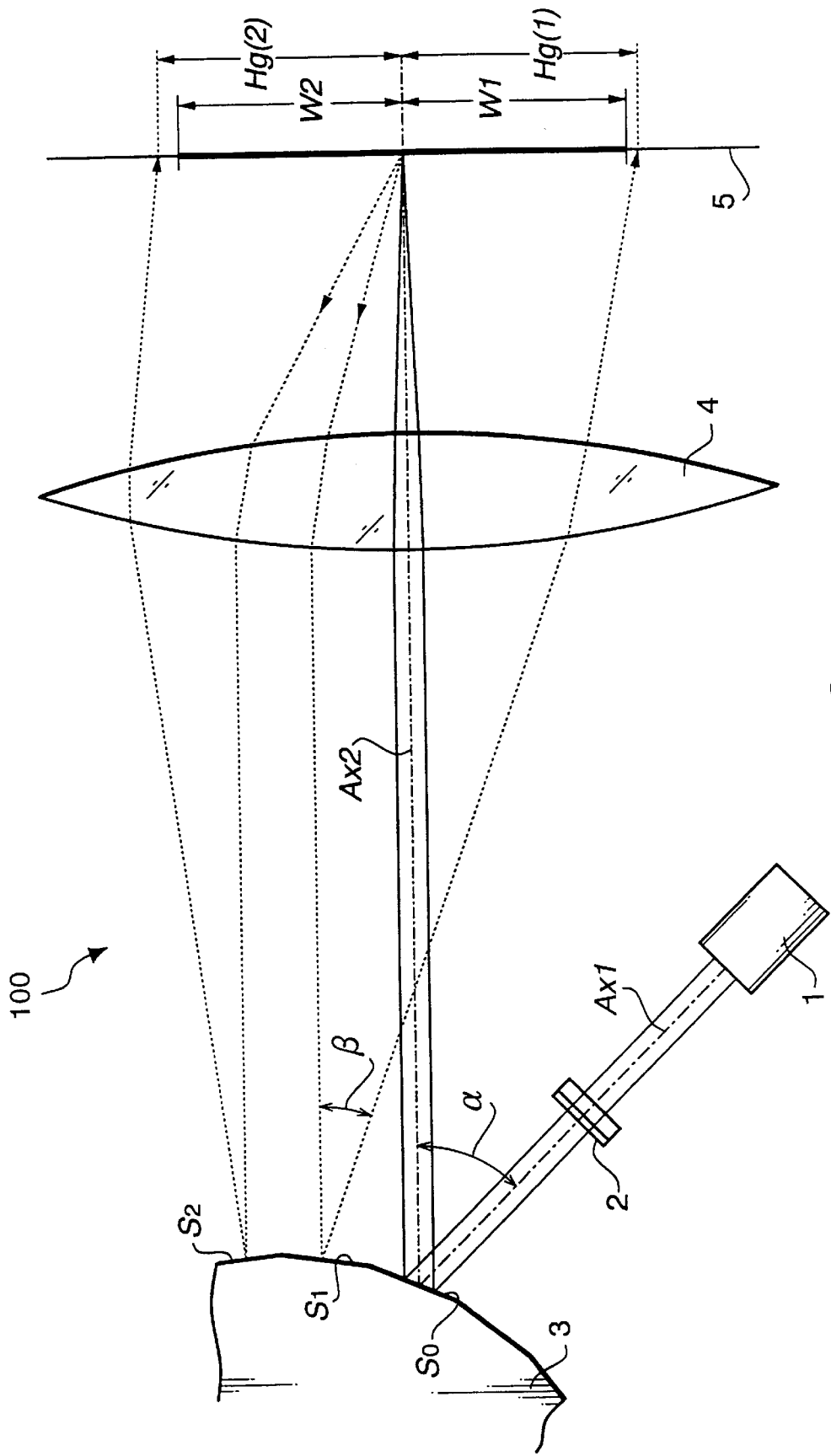
FIG. 1 is a schematic plan view of a laser scanning optical system according to an embodiment of the present invention.

FIG. 1 shows a schematic plan view of a laser scanning optical system 100 according to an embodiment of the invention. As illustrated in FIG. 1, the laser scanning optical system 100 is constituted such that a light beam emitted from a laser source 1 is directed to a polygonal mirror 3 through a cylindrical lens 2. In this laser scanning optical system 100, a principal ray of the beam emitted by the laser source 1 and a principal ray of the beam deflected by the polygonal mirror 3 are included in the same plane, which is referred to as a main scanning plane hereinafter. The light beam deflected by the polygonal mirror 3 scans a target surface 5 via an fθ lens 4 which functions as an imaging optical system. It should be noted an optical axis Ax2 of the fθ lens 4 is included in the main scanning plane. In this specification, a plane which is perpendicular to the main scanning plane and including the optical axis Ax2 of the fθ lens 4 will be referred to as an auxiliary scanning plane. Further, a main scanning direction is defined as an extending direction of a locus of a scanning beam on a plane perpendicular to the optical axis Ax2 of the fθ lens 4, and an auxiliary scanning direction is defined as a direction on the plane perpendicular to the optical axis Ax2 and also perpendicular to the main scanning direction.

The cylindrical lens 2 has a power only in the auxiliary scanning direction.

The laser scanning optical system 100 illustrated in FIG. 1 may be employed in, for example, a laser plotter, such as one called as a direct imager, which depicts a pattern directly on a printed circuit board. In the direct imager, in order to realize a high depiction speed, the number of the reflection surfaces of the polygonal mirror is sixteen (16) or more.

The number of the reflection surfaces of the polygonal mirror 3 illustrated in FIG. 1 is twenty-four (24), although only four (4) of them are shown in the drawing.

The cylindrical lens 2 functions such that a parallel light beam emitted from the laser source 1 is converged only in the auxiliary scanning direction to form a line-like image in the vicinity of the reflection surface of the polygonal mirror 3. The light converges in the vicinity of the polygonal mirror 3 by the cylindrical lens 2 is then reflected by the polygonal mirror 3 and incident on the fθ lens 4 as a diverging beam in the auxiliary scanning direction, and as a parallel beam in the main scanning direction.

The fθ lens 4 has a positive power, in the auxiliary scanning direction, to converge the light beam directed from the polygonal mirror 3 onto the target surface 5. That is, the fθ lens 4 has a power to make the reflection surface to which the laser beam is incident from the light source 1 and the target surface 5 conjugate in the auxiliary scanning plane, whereby an error which might occur in positioning of a beam spot on the target surface in the auxiliary scanning direction due to possible tilting of a reflection surface of the polygonal mirror 3 can be avoided.

In FIG. 1, in order to identify each reflection surface, the reflection surfaces of the polygonal mirror 3 are represented by Si, where i=0, 1, 2, . . . . Further, the reflection surface by which the normal light is incident and deflected is a surface S0, while the surface next to the surface S0 and on a side opposite to a side where the light source 1 is provided is indicated as a surface S1. Further, a reflection surface next to the surface S1 is referred to the surface S2.

If an axis Ax1, which coincides with the principal ray of the light beam emitted by the laser source 1 and incident on the surface S0, crosses the optical axis Ax2 at an angle of α (unit:rad), an incident angle of a beam which is reflected by the target surface 5 and incident on the surface S0 through the fθ lens 4 is α/2 (rad). It should be noted that, since a principal ray of the beam which is reflected by the target surface 5 and incident on the surface S0 through the fθ lens 4 coincides with the axes Ax1 and Ax2, the reflected beam incident on the surface S0 is not explicitly indicated in FIG. 1.

In FIG. 1, a principal ray of a beam which is reflected by the target surface and then incident on the surface S1 is substantially parallel with the principal ray of the beam which is reflected by the target surface and incident on the surface S0. Accordingly, the principal ray of the beam which is reflected by the target surface and then incident on the surface S1 is substantially parallel to the optical axis Ax2.

Assume that the number of reflection surfaces of the polygonal mirror 3 is N (on assumption that the polygonal mirror is a regular polygon on the main scanning plane), and that an incident angle of a beam which is reflected by the target surface and then incident on the surface S1 through the fθ lens 4 is β/2 [rad], then, since inclination with respect to the optical axis Ax2 of surface S1 is greater than that of surface S0 by $2\pi/N$, relationship between the incident angles of principal rays of the beams incident on surfaces S0 and S1 can be expressed by equation (3) below.

$$\frac{\beta}{2} = \frac{\alpha}{2} - \frac{2\pi}{N} \quad (3)$$

It should be noted that angles in equation (3) are measured in clockwise direction with respect to the incident beam.

The ghost light beam incident on the surface S1 is then reflected to be incident on the fθ lens 4. As shown in FIG. 1, the principal ray of the ghost light beam reflected by the polygonal mirror 3 and incident on the fθ lens 4 and the optical axis of the fθ lens 4 forms an angle of β. Therefore, a position Hg(1) (unit:mm), which represent a position on the target surface 5 with respect to the optical axis Ax2, of the stationary ghost image is calculated such that:

$$Hg(1) = -f\beta \quad (4),$$

where, f represent a focal length of the fθ lens 4 on the main scanning plane, and a light source side position is represented by a negative value.

It should be noted that in equation (4), it is defined that a position on the laser source side has a negative value.

From equations (3) and (4), the position Hg(1) can be expressed as follows:

$$Hg(1) = 2 \times \left(\frac{2\pi}{N} - \frac{\alpha}{2}\right) \cdot f = \left(\frac{4\pi}{N} - \alpha\right) \cdot f \quad (5)$$

In General, if a beam reflected on the target surface 5 is incident on a surface Si through the fθ lens 4 at an incident angle of θ/2, the incident angle of a principal ray of a light beam incident on an i-th surface Si is obtained by equation (6).

$$\frac{\theta}{2} = \frac{\alpha}{2} - \frac{2\pi}{N} \cdot i \quad (6)$$

Then, a position of the stationary ghost due to the i-th surface Si is expressed as follows:

$$Hg(i) = \left(\frac{4\pi}{N} \cdot i - \alpha\right) \cdot f \quad (7)$$

If the following conditions are satisfied, stationary ghost images formed by surfaces $S_m$ and $S_{m+1}$ are positioned out of the scanning range, respectively.

$$Hg(m) < W1 \quad (8)$$

$$Hg(m+1) > W2 \quad (9)$$

where, m is a natural number arbitrarily chosen, W1 (unit:mm) represents a position, with respect to the optical axis Ax2, of the light source side end of an effective scanning range on the target surface 5, and W2 (unit:mm) represents a position of the other end of the effective scanning range on the target surface. It should be noted that a position on the light source side with respect to the optical axis Ax2 is represented by a negative value, and a position on the other side is represented by a positive value.

Specifically, when the above conditions are satisfied, the stationary ghost image formed by the surface Sm is positioned on the light source side with respect to the light source side end of the effective range, and the stationary ghost image formed by the surface Sm+1 is positioned on the other side with respect to the other end of the effective scanning range.

Once the above conditions are satisfied, for any i which is less than m, $$Hg(i) < W1$$

is satisfied. Further, for any i which is greater than m+1, $$Hg(i) > W2$$

is satisfied.

From condition (8) and equation (7), the following is obtained:

$$Hg(m) = \left(\frac{4\pi}{N} \cdot m - \alpha\right) \cdot f < W1 \quad (10)$$

and, further, $$\frac{4\pi}{N} \cdot m - \alpha < \frac{W1}{f} \quad (11)$$

is obtained.

By modifying the above, the following condition (12) is obtained.

$$\alpha < \frac{4\pi}{N} \cdot m - \frac{W1}{f} \quad (12)$$

Similarly, from condition (9) and equation (7), the following is obtained:

$$Hg(m+1) = \left(\frac{4\pi}{N} \cdot (m+1) - \alpha\right) \cdot f > W2 \quad (13)$$

and, further, $$\frac{4\pi}{N} \cdot (m+1) - \alpha > \frac{W2}{f} \quad (14)$$

is obtained.

By modifying the above, the following condition (15) is obtained.

$$\alpha < \frac{4\pi}{N} \cdot (m+1) - \frac{W2}{f} \quad (15)$$

If m=1, by satisfying the above condition (12), the ghost light reflected by the reflection surface S1 is led to the area out of the laser-source-side end of the effective scanning range, as illustrated in FIG. 1, while, by satisfying the above condition (15), the ghost light reflected by the second-next reflection surface S2 is led to the area out of the other end of the effective scanning range.

If m=2, the ghost light reflected by the second-next reflection surface S2 is led to the area out of the laser-source-side end of the effective scanning range, while the ghost light reflected by the reflection surface S3 is led to the area out of the other end of the effective scanning range.

As described above, by satisfying both of the conditions (12) and (15), the ghost light reflected by any reflection surface of the polygonal mirror is directed out of the effective scanning range on the target surface, thereby preventing the appearance of stationary ghost.

When the scanning optical system is to be designed, the value of "m" should be determined based upon the number of reflection surfaces of the polygonal mirror and the overall constitution of the scanning optical system. Then, the value of "m" should be introduced into the conditions (12) and (15) to obtain the allowable range of the angle "$\alpha$", and then to determine the most advantageous value thereof for layout of the scanning optical system.

In the scanning optical system illustrated in FIG. 1 is designed under the conditions of m=1, N=24, f=100, W1=−20, and W2=20. In this case, from conditions (12) and (15), $$0.724 \text{ rad } (41.5°) < \alpha < 0.847 \text{ rad } (48.5°)$$

In the scanning optical system 100, then the angle $\alpha$ is set to be $\pi/4$ rad (i.e., 45°).

For another example, in the scanning optical system having the same optical elements, and m is set to 2, the following condition is obtained.

$$1.247 \text{ rad } (71.5°) < \alpha < 1.371 \text{ rad } (78.5°).$$

In this case, $\alpha$ may be set to 1.309 rad (75°).

For a further example, given that m=3, N=30, f=100, W1=−20, and W2=20, then the following condition can be obtained, $$1.456 \text{ rad } (83.5°) < \alpha < 1.475 \text{ rad } (84.6°),$$

and $\alpha$ may be set to be 1.465 rad (84°).

Theoretically, there is no limit, when designing a laser scanning optical system, in the number N of reflecting surfaces of polygonal mirror to be employable. However, it is practical for the number N to be several tens, and to design a system such as to be $\alpha < 90$.

The present disclosure relates to a subject matter contained in Japanese Patent Application No. HEI 09-197844, filed on Jul. 8, 1997, which is expressly incorporated herein by reference in its entirety.

What is claimed is:

1. A laser scanning optical system wherein a light beam emitted from a laser source is deflected by a polygonal mirror to a scanning target surface via an imaging optical system, said laser scanning optical system being arranged to satisfy following conditions:

$$a < \frac{4\pi}{N} \cdot m - \frac{W1}{f}$$

$$a > \frac{4\pi}{N} \cdot (m+1) - \frac{W2}{f}$$

wherein,

α represents an angle (unit:rad) at which a principal ray of light beam incident on said polygonal mirror from said laser source and the optical axis of said imaging optical system crosses;

N represents the number of reflection surfaces of said polygonal mirror;

f represents a focal length (unit:mm) of said imaging optical system in a main scanning plane;

W1 represents a position (unit:mm) on said target surface with respect to the optical axis of said imaging optical system to the laser-source-side end of an effective scanning range, W1 having a negative value;

W2 represents a position (unit:mm) on said target surface with respect to the optical axis of said imaging optical system to the other end of said effective scanning range, W2 having a positive value; and m is a natural number chosen at discretion based upon the number N of reflection surfaces of said polygonal mirror.

2. The laser scanning optical system according to claim 1, wherein the principal ray of a light beam incident on said polygonal mirror the principal ray of a light beam deflected by said polygonal mirror are included in a main scanning plane.

3. The laser scanning optical system according to claim 1, wherein said polygonal mirror and said scanning target surface are substantially conjugate via said imaging optical system in an auxiliary scanning plane.

4. The laser scanning optical system according to claim 1, wherein said polygonal mirror comprises 16 or more reflection surfaces.

5. The laser scanning optical system according to claim 1, wherein α is set to be less than 90°.

6. The laser scanning optical system in accordance with claim 1, wherein said imaging optical system comprises an fθ lens.

* * * * *